US009298915B2

(12) United States Patent
Goddard

(10) Patent No.: US 9,298,915 B2
(45) Date of Patent: Mar. 29, 2016

(54) INTELLIGENT HEURISTICS FOR FILE SYSTEMS AND FILE SYSTEM OPERATIONS

(75) Inventor: Denis Michael Goddard, Contoocook, NH (US)

(73) Assignee: Oracle International Corporation, Redwood Shores, CA (US)

(*) Notice: Subject to any disclaimer, the term of this patent is extended or adjusted under 35 U.S.C. 154(b) by 54 days.

(21) Appl. No.: 13/604,620

(22) Filed: Sep. 5, 2012

(65) Prior Publication Data

US 2014/0068202 A1    Mar. 6, 2014

(51) Int. Cl.
| G06F 13/00 | (2006.01) |
| G06F 21/00 | (2013.01) |
| G06F 21/55 | (2013.01) |
| G06F 21/60 | (2013.01) |
| G06F 21/62 | (2013.01) |
| G06F 12/14 | (2006.01) |

(52) U.S. Cl.
CPC ............. G06F 21/554 (2013.01); G06F 21/62 (2013.01)

(58) Field of Classification Search
CPC ......... G06F 13/00; G06F 21/00; G06F 21/55; G06F 21/60; G06F 21/62; G06F 21/554; G06F 12/44; G06F 12/1458; G06F 12/1483
USPC ............... 711/154, 147, 5; 718/100; 712/228; 702/189; 719/314; 707/769
See application file for complete search history.

(56) References Cited

U.S. PATENT DOCUMENTS

| 6,292,797 | B1 * | 9/2001 | Tuzhilin et al. ................. 1/1 |
| 6,647,400 | B1 * | 11/2003 | Moran ............................. 1/1 |
| 7,363,656 | B2 * | 4/2008 | Weber et al. ................... 726/23 |
| 7,461,404 | B2 * | 12/2008 | Dudfield et al. ............... 726/25 |
| 2004/0034794 | A1 * | 2/2004 | Mayer et al. ................... 713/200 |
| 2005/0203921 | A1 * | 9/2005 | Newman et al. ............... 707/100 |
| 2006/0150249 | A1 * | 7/2006 | Gassen et al. .................. 726/23 |
| 2007/0156897 | A1 * | 7/2007 | Lim ............................... 709/225 |
| 2008/0126933 | A1 * | 5/2008 | Gupta et al. ................... 715/712 |
| 2009/0049558 | A1 * | 2/2009 | Lotspiech ............ G06F 21/10 726/28 |
| 2009/0089869 | A1 * | 4/2009 | Varghese ........................ 726/7 |
| 2010/0306179 | A1 * | 12/2010 | Lim ............................... 707/688 |
| 2011/0035805 | A1 * | 2/2011 | Barkan et al. .................. 726/26 |

OTHER PUBLICATIONS

Debar et al, "Aggregation and Correlation of Intrusion-Detection Alerts", "Recent Advances in Intrusion Detection" Lecture Notes in Computer Science vol. 2212, 2001, pp. 85-103.*
Yang et al, "Improving Search in Peer-to-Peer Networks", Proceedings of the 22 nd International Conference on Distributed Computing Systems (ICDCS'02), 2002 IEEE, pp. 1-10.*
Scarfone et al, "Guide to Intrusion Detection and Prevention Systems (IDPS)", Feb. 2007, National Institute of Standards and Technology (NIST) Special Publication 800-94, pp. 1-127.*
Gallagher "Disgruntled employee? Oracle doesn't seem to care about Solaris 11 code leak," Ars Technica online magazine, Conde Nast (Dec. 21, 2011).

* cited by examiner

Primary Examiner — Hal Schnee
Assistant Examiner — Kamal Dewan
(74) Attorney, Agent, or Firm — Kilpatrick Townsend and Stockton LLP

(57) ABSTRACT

A data system may detect and halt unauthorized bulk data copy operations without interfering with or degrading authorized data copy operations. Characteristics of a request for access to a file system may be analyzed to determine whether a bulk data copy operation has been requested by a user. The bulk data copy operation may be allowed if the operation is below a particular permitted copy threshold or if the requesting user is authorized to execute a bulk data copy operation exhibiting certain characteristics.

21 Claims, 5 Drawing Sheets

INTELLIGENT HEURISTICS FOR FILE SYSTEMS AND FILE SYSTEM OPERATIONS

BACKGROUND

With the growth of digital information technology and infrastructure, a great deal of critical information is stored on large-scale electronic systems by individuals, corporations, and governments. Internet and other networking technologies allow rapid and effectively cost-free duplication of significant amounts of data stored electronically. Innumerable data files may be accessed and copied without regard to location in real time. While such ease of access to critical information can increase productivity, the risk of misappropriation of sensitive and restricted information also increases. The frequency of such operations grows as data sets and the number of people and entities accessing those data sets grow to enormous sizes, and cannot each be monitored individually without degrading or eliminating many, if not all, of the advantages of instant and unfettered access to significant amounts of digital data.

DETAILED DESCRIPTION

In the following description, for the purposes of explanation, specific details are set forth in order to provide a thorough understanding of embodiments of the invention. However, it will be apparent that the invention may be practiced without these specific details.

System Overview

Figure 1:
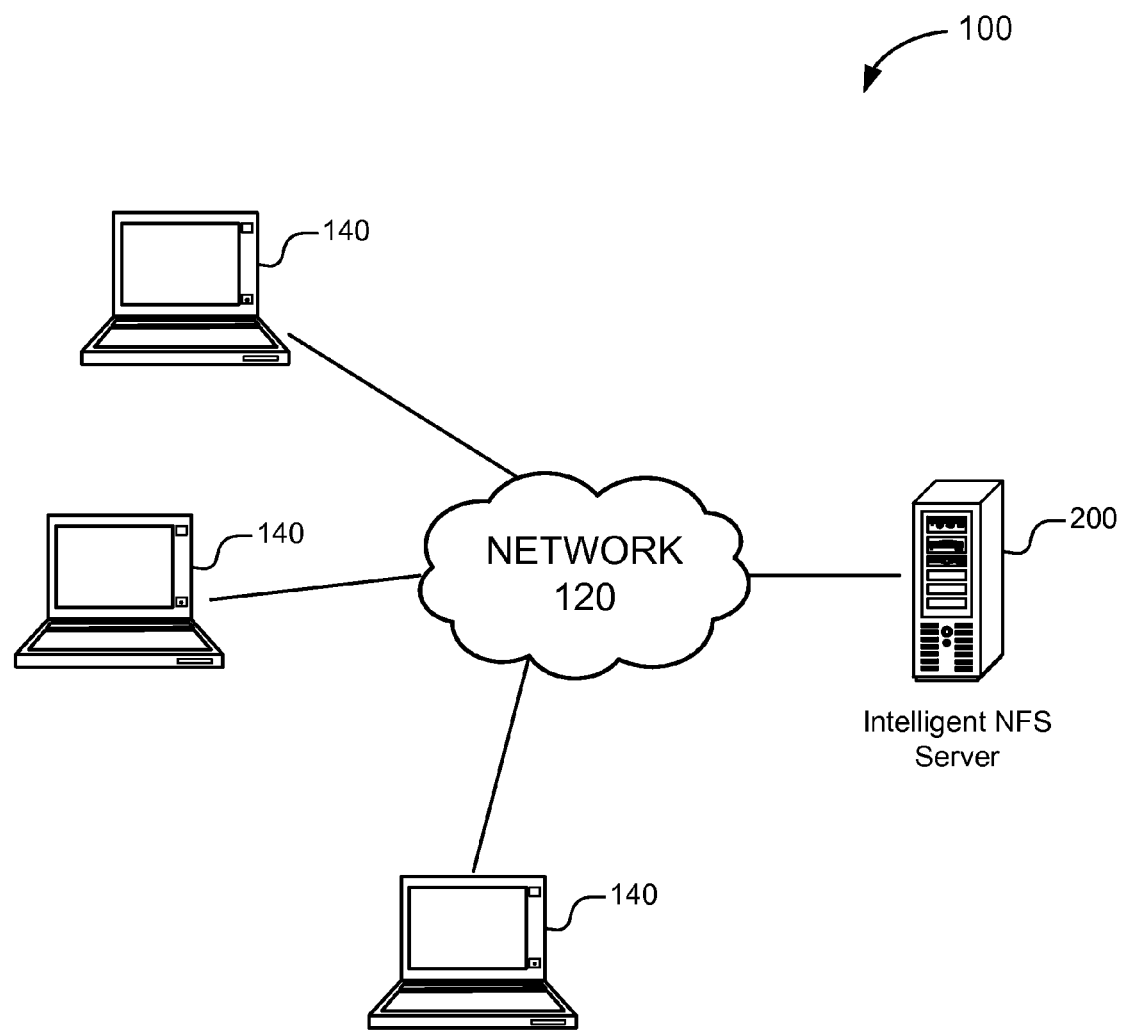
FIG. 1 is a diagram that illustrates an exemplary network including an intelligent Network File Service server and clients.

FIG. 1 is a simplified diagram an exemplary system environment including an intelligent Network File Service server, a network, and clients.

As shown, system environment 100 includes one or more client computing devices 140, which are configured to operate client applications including native client applications and possibly other applications such as a web browser, or the like. In various embodiments, client computing devices 140 may interact with an intelligent Network File Service ("NFS") server 200. Client computing devices 140 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 140 may be any other electronic device, such as a thin-client computer, Internet-enabled gaming system, and/or personal messaging device, capable of communicating over a network (e.g., network 120 described below). Although exemplary system environment 100 is shown with three client computing devices, any number of client computing devices may be supported. Other devices such as devices with sensors, etc. may interact with server 200.

System environment 100 may include a network 120. Network 120 may be any type of network familiar to those skilled in the art that can support data communications using any of a variety of commercially-available protocols, including without limitation TCP/IP, SNA, IPX, AppleTalk, and the like. Merely by way of example, network 120 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 100 also includes one or more server computers 200 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 200 may be adapted to run one or more services or software applications.

Figure 2:
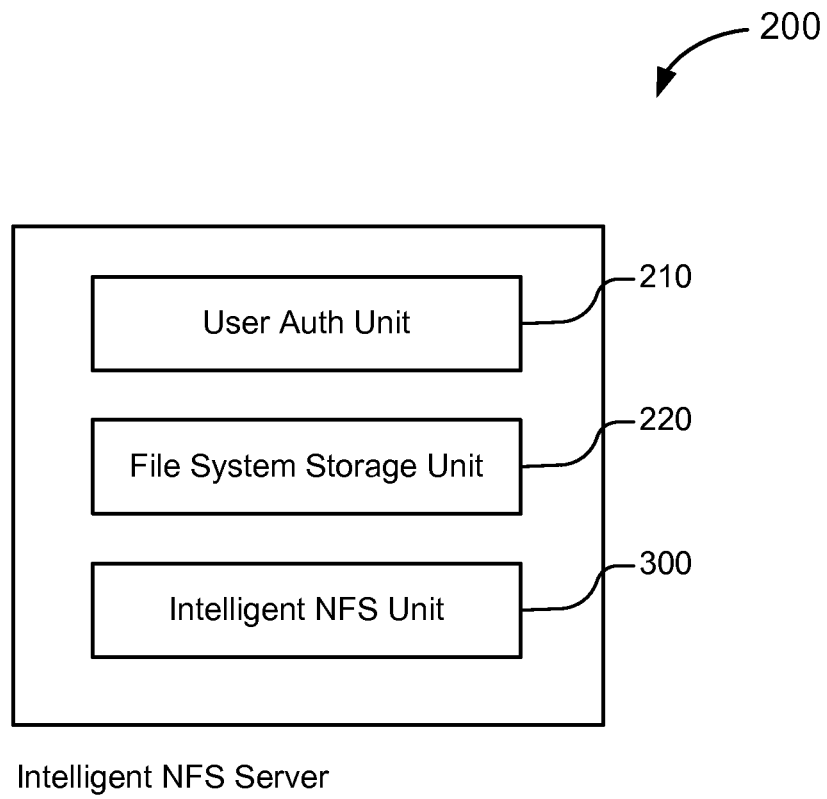
FIG. 2 is a simplified block diagram illustrating an exemplary intelligent Network File Services server.

FIG. 2 is a simplified block diagram illustrating an exemplary intelligent Network File Services server.

Intelligent NFS server 200 may run an operating system including any of those discussed above, as well as any commercially available server operating system. Server 200 may also run any of a variety of additional server applications and/or mid-tier applications, including HTTP servers, FTP servers, CGI servers, JAVA servers, database servers, and the like. Exemplary database servers include without limitation those commercially available from Oracle, Microsoft, Sybase, IBM and the like.

Intelligent NFS server 200 may comprise software elements including an operating system and/or other code, such as an application program (which may be a client application, Web browser, mid-tier application, RDBMS, etc.). It should be appreciated that alternative embodiments of a computer system may have numerous variations from that described above. For example, customized hardware might also be used and/or particular elements might be implemented in hardware, software (including portable software, such as applets), or both. Further, connection to other computing devices other or in addition to those described, such as but not limited to network input/output devices, may be employed.

User authentication unit 210 of intelligent NFS server 200 may, in exemplary embodiments, determine what levels of authorization a user may have with respect to resources, including but not limited to files and directories, of a file system. In some embodiments, user permissions may, for example, be maintained in a repository storing permissions specific to bulk data copy operations, or in an external or general-purpose repository, such as file system permissions information maintained by a UNIX or UNIX-like system. Although user authentication unit 210 is illustrated as an element of intelligent NFS server 200, it is understood that in some embodiments, user authentication unit 210 may be remote to intelligent NFS server 200, or in some embodiments may be omitted from intelligent NFS server 200 or system environment 100.

File system storage unit 220 of intelligent NFS server 200 may store data in a file system as, for example but not limited to, files and directories. By way of example, file system storage unit 220 may include devices such as disk drives, optical storage devices, and solid-state storage devices such as a random access memory (RAM) and/or a read-only memory (ROM), which can be programmable, flash-updateable and/or the like. The file system storage unit may be embodied as a computer-readable storage media reader, a communications subsystem (e.g., a modem, a network card (wireless or wired), an infra-red communication device, etc.), and working memory, which may include RAM and ROM devices as described above. In some embodiments, the file system storage unit comprises one or more physical storage devices.

Intelligent NFS unit 300 of intelligent NFS server 200 may make one or more determinations of whether a bulk data copy operation has occurred, and whether such a bulk data copy operation is permitted. In some embodiments, intelligent NFS unit 300 may determine one or more of whether a bulk data copy operation has occurred, whether a bulk data copy operation exceeded a predetermined threshold for permitted data copy operations, and whether a user is authorized to execute a bulk data copy operation exceeding a permitted data copy threshold. In some embodiments, intelligent NFS unit 300 may determine one or more of whether a plurality of aggregated requests correspond to a pattern of bulk data copy operations, whether aggregated requests exceed a predetermined threshold for permitted data copy operations, and whether a user is authorized to execute a bulk data copy operation exceeding a permitted data copy threshold.

Figure 3:
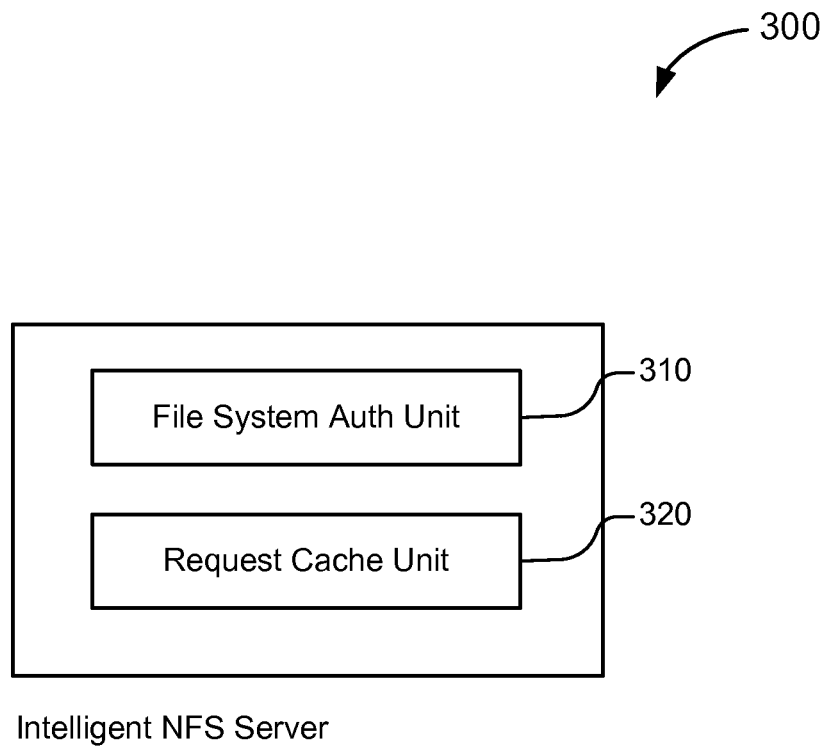
FIG. 3 is a simplified block diagram illustrating an exemplary intelligent Network File Services unit.

FIG. 3 is a simplified block diagram illustrating an exemplary intelligent Network File Services unit.

File system authorization unit 310 of intelligent NFS unit 300 may control make one or more determinations of whether a bulk data copy operation has occurred, and whether such a bulk data copy operation is permitted. In some embodiments, file system authorization unit 310 may determine one or more of whether a bulk data copy operation has occurred, whether a bulk data copy operation exceeded a predetermined threshold for permitted data copy operations, and whether a user is authorized to execute a bulk data copy operation exceeding a permitted data copy threshold. In some embodiments, file system authorization unit 310 may interact with request cache unit 320 to determine one or more of whether a plurality of aggregated requests correspond to a pattern of bulk data copy operations, whether aggregated requests exceed a predetermined threshold for permitted data copy operations, and whether a user is authorized to execute a bulk data copy operation exceeding a permitted data copy threshold.

Request cache unit 320 of intelligent NFS unit 300 may store previous requests for access to a file system by one or more users. In some embodiments, one or more of commands executed by a user or characteristics of a request for access to a file system may be stored. In some embodiments, only requests or characteristics for requests classified as bulk data copy operations are stored in request cache unit 320. A request cache unit may store requests or characteristics for requests based on predetermined time intervals, a predetermined storage limit, or a combination of those or other factors as are known or may become known in, for example but not limited to, the art of data backup and storage.

Similarly to file system storage unit 220, request cache unit 320 may include devices such as disk drives, optical storage devices, and solid-state storage devices such as a random access memory (RAM) and/or a read-only memory (ROM), which can be programmable, flash-updateable and/or the like. The files system storage unit may be embodied as a computer-readable storage media reader, a communications subsystem (e.g., a modem, a network card (wireless or wired), an infra-red communication device, etc.), and working memory, which may include RAM and ROM devices as described above. In some embodiments, the file system storage unit comprises one or more physical storage devices. Although request cache unit 320 is illustrated as an element of intelligent NFS unit 300, it is understood that in some embodiments request cache unit 320 may be remote to intelligent NFS unit 300, or in some embodiments may be omitted from intelligent NFS unit 300, intelligent NFS server 200, or system environment 100.

Intelligent Heuristics for a Request for File System Access

Figure 4:
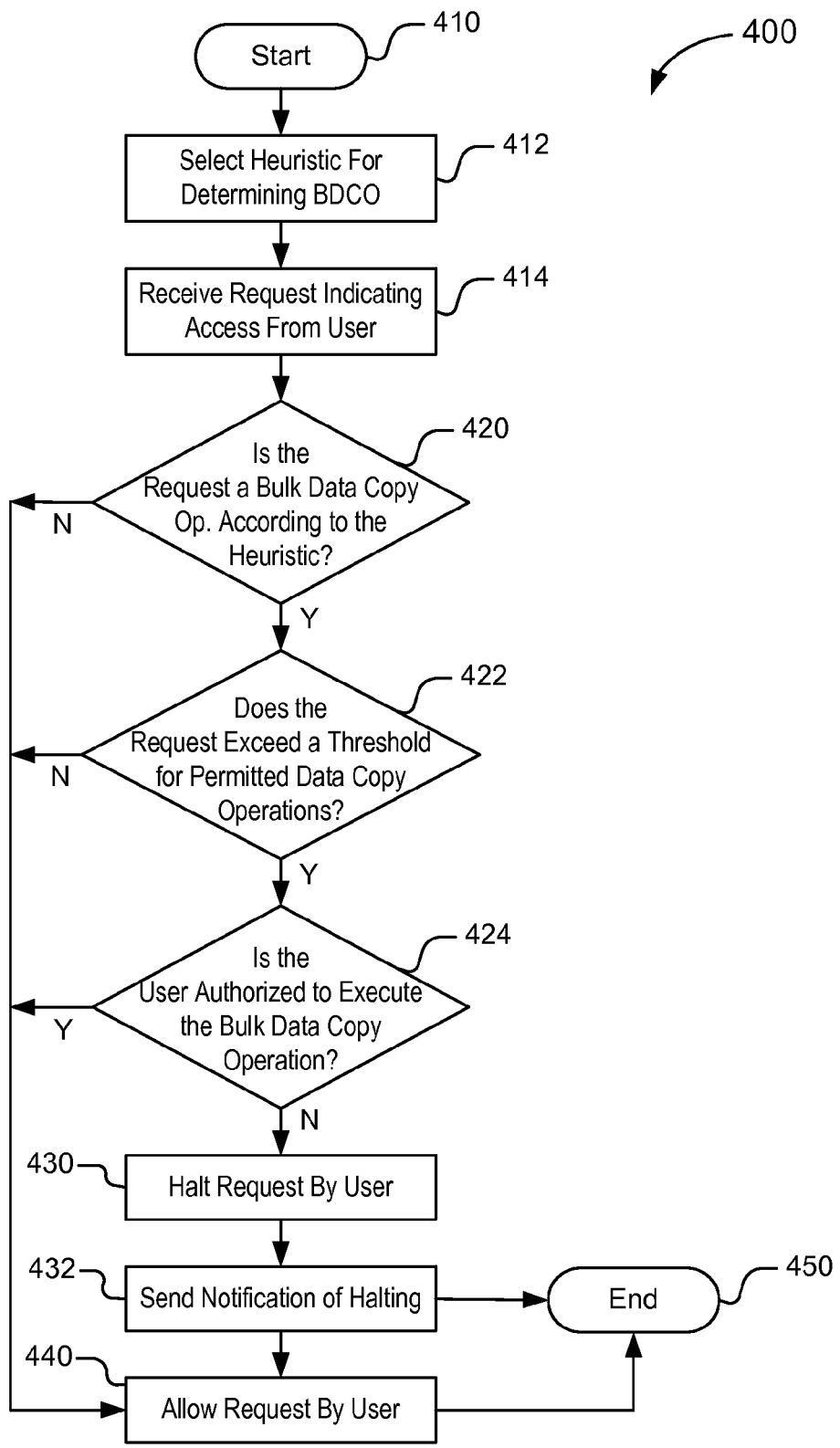
FIG. 4 is an exemplary flow diagram of intelligent heuristics applied to a request for access to a file system.

FIG. 4 is an exemplary flow diagram of intelligent heuristics applied to a request for access to a file system.

Flowchart 400 is an exemplary flow diagram of intelligent heuristics applied to a request for access to a file system. It is to be understood that not all steps of FIG. 4 are required, that additional steps may be incorporated or interspersed with the illustrated steps, and that particular steps as illustrated may be rearranged or omitted as necessary without departing from the scope of the invention. At step 410, a method for applying intelligent heuristics to a request for access to a file system begins. The method proceeds to step 412.

At step 412, a heuristic for detecting a bulk data copy operation is selected. A heuristic may be chosen from a repository of available predefined heuristics. The heuristic may be based on characteristics indicative of a particular bulk data copy operation, and may be defined in terms of one or more of a plurality of "fingerprints" describing behaviors of known bulk data copy operations through a file system. For example, a bulk data copy operation in a UNIX or UNIX-like file system may be initiated by the command "cp -R ." which initiates a copy operation ("cp") of all files and directories in the current directory (".") and all files and directories contained within the current directory ("-R"). The "fingerprint" may understand an order in which this or other operations may index and traverse the data set requested for a bulk data copy. For example, the bulk data copy operation may perform a depth-first or breadth-first traversal of the file system during the bulk data copy, or may traverse the file system alphabetically during its ordered traversal. In addition, new fingerprints may be added by executing the operation and monitoring the manner in which the copy operation accesses individual files and directories during completion of the request. This way, a repository of "fingerprints" may be maintained and extended to describe known bulk data copy operations across an arbitrary number of possible file systems and implementations of bulk data copy operations. The "fingerprints" themselves may be stored in any data structure or combination of data structures that may facilitate their use. The method then proceeds to step 414.

At step 414, a request by a user for access to a file system is received. The user request may be formatted arbitrarily according to the user interface, network interface, file system used, or any other parameter of the client device from which the user makes the request or the server device at which the user request is received and processed. For example, the user request may be made via a graphical user interface ("GUI") or a command line interface. Command line interfaces may include, but are not limited to, UNIX or UNIX-like shell interfaces such as the Bourne shell ("sh"), the Bourne-again shell ("bash"), the C shell ("csh"), the Z shell ("zsh") or any other type of shell or interface that may communicate a user request to a device including a file system. The method then proceeds to step 420.

Once the user request is received at the file system, one or more steps may be executed to determine whether a permitted bulk data copy operation has occurred. While a plurality of steps are discussed below determining various aspects of the received user request, it is understood that the below-noted determinations are exemplary in nature, and that determinations may be omitted, rearranged, or substituted for other operations without departing from the scope of the invention. In some embodiments, the bulk data copy operation is allowed to begin, in order to preserve responsiveness of the file system and overall productivity of users making requests of the system.

At step 420, it is determined whether the request is a bulk data copy operation. The request may be matched against one, some or all of the "fingerprints" to determine whether the operation exhibits characteristics of a bulk data copy operation. In some embodiments, if the bulk data copy operation exhibits characteristics of one or more types of bulk data copy operation, it can be determined whether the operation is sufficiently similar to the "fingerprint" to classify the operation as a bulk data copy operation; e.g., it is determined whether the operation is similar according to a predetermined percentage of characteristics of the "fingerprint" matching characteristics of the executing copy operation. In some embodiments, the bulk data copy operation matches all characteristics of the "fingerprint" before being determined to be a bulk data copy operation. If the operation is not determined to be a bulk data copy operation, then the operation is permitted and the method proceeds to step 440, where the request is permitted to continue to completion. If the operation is determined to be a bulk data copy operation, the method proceeds to step 422.

At step 422, it is determined whether the request exceeds a threshold for permitted data copy operations. Though an operation may be identified as a bulk data copy operations, in some instances bulk data copy operations of a certain scale are both permitted and promote user productivity. In these instances, bulk data copy operations are permitted where the number of files and directories requested to be copied is below a predetermined permitted copy threshold. The permitted copy threshold may be defined in a number of ways. For example, the permitted copy threshold may be, but is not limited to, an absolute number of files or directories requested to be copied, or a number of files or directories equal to a particular percentage of total files and/or directories of the file system. The permitted copy threshold may thus be tailored to the specific requirements of the file system. In some embodiments, step 422 is omitted and no operations identified as bulk data copy operations are permitted. If the operation is not determined to exceed the permitted copy threshold, then the operation is permitted and the method proceeds to step 440, where the request is permitted to continue to completion. If the operation is determined to exceed the permitted copy threshold, the method proceeds to step 424.

At step 424, it is determined whether the user is authorized to execute the bulk data copy operation exceeding the permitted copy threshold. The user's identity may be compared to a repository of users permitted to execute bulk data copy operations of any size. The user's permissions may, for example, be authorized against a repository storing permissions specific to bulk data copy operations, or may be authorized against an external repository, such as file system permissions information maintained by a UNIX or UNIX-like system. In some embodiments, step 424 is omitted and no operations identified as bulk data copy operations are permitted. If the user is authorized to exceed the permitted copy threshold, then the operation is permitted and the method proceeds to step 440, where the request is permitted to continue to completion. In some embodiments, step 424 occurs before step 422, and if it is determined that the user is authorized to execute bulk data copy operations of any size, then the method proceeds immediately to step 440. If user is not authorized to execute the bulk data copy operation exceeding the permitted copy threshold, the method proceeds to step 430.

At step 430, the bulk data copy operation is halted. In some embodiments, a bulk data copy operation that has already begun is halted. Once the request is halted, additional restrictions may be placed on the user making the unauthorized request. The user's subsequent file access requests may be prevented from commencing. This 'lock-out' of the user from the file system may be limited to subsequent data copy operations, and may be limited to preventing data copy operations for a predetermined time period. In some embodiments, restrictions on the user may be more severe. More severe restrictions may include exclusion from the entire file system, and may include extended or permanent exclusion from a subset or the entirety of the file system. Additional or substitute restrictions may be placed on the user as are known, and may be combined with, replace, or supplement the above-noted restrictions as appropriate to meet particular and varying security requirements. The method then proceeds to step 432.

At step 432, a notification of halting is sent to a system administrator or other security system for further resolution. The notification and subsequent optional security countermeasures vary depending on the type of enterprise and the sensitivity of the information being protected on the file system. As an example of a notification at a minimal security level, a notification may include logging of the unauthorized bulk data copy operation. More robust security countermeasures may include notification of file system administrators, or notification of security professionals. In some embodiments, the user is not notified of the restrictions enacted after the unauthorized bulk data copy operation, and is not notified that the requested operation is not authorized. In some embodiments, denials of further access to copy operations or the file system appear to the user as failures of the file system in handling user requests. In some embodiments, no notification of halting is sent once a bulk data copy operation is halted. The method then proceeds to step 450.

At step 440, a bulk data copy operation is permitted to continue to completion. The method then proceeds to step 450.

At step 450, the method ends. In some embodiments, the method may be implemented to continuously poll a file system, or may be invoked as requests are made by users, or may be implemented in any other manner or combination of manners.

Intelligent Heuristics Aggregating Requests for File System Access

Figure 5:
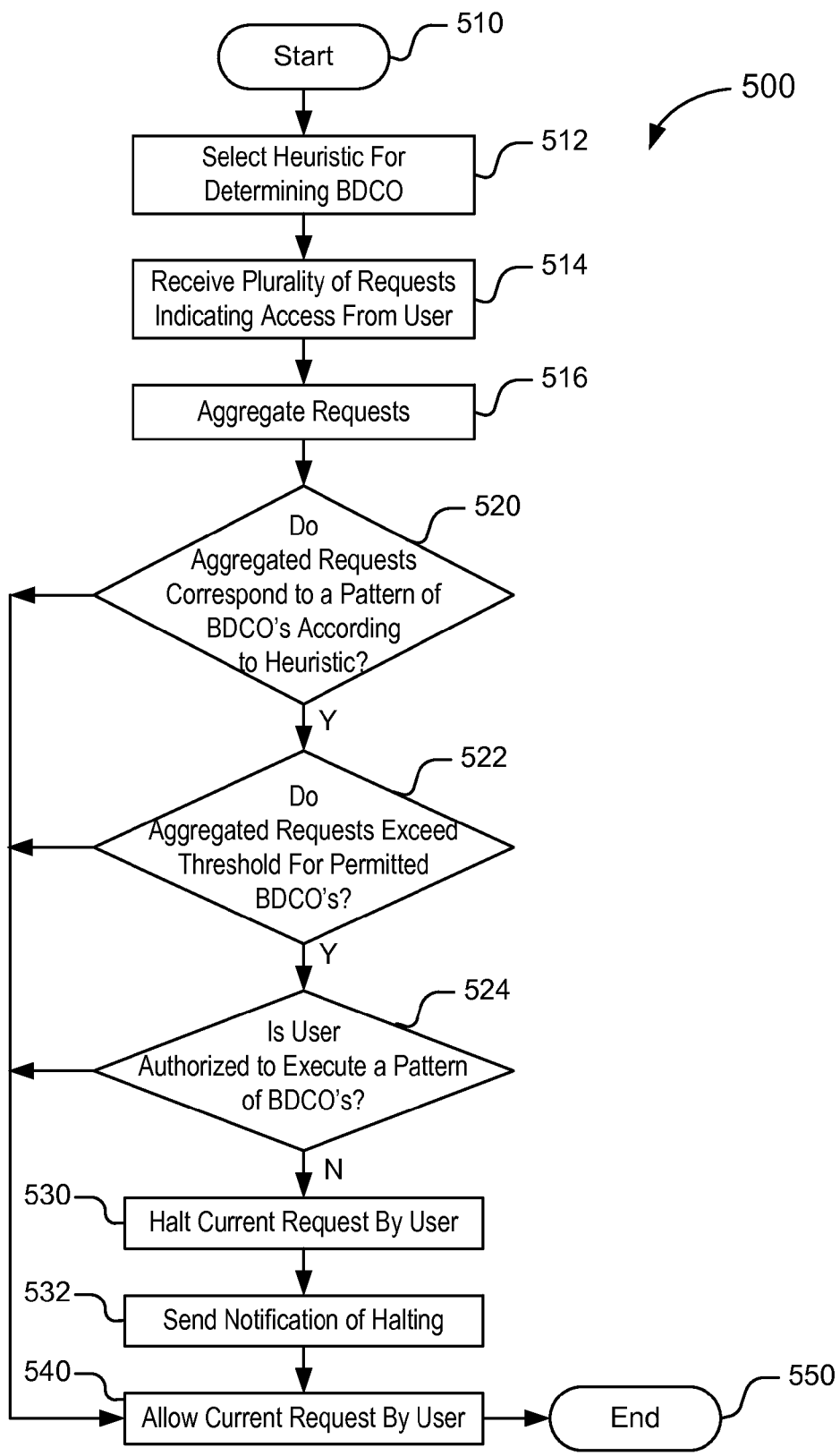
FIG. 5 is an exemplary flow diagram of intelligent heuristics applied to a plurality of requests for access to a file system.

FIG. 5 is an exemplary flow diagram of intelligent heuristics applied to a plurality of requests for access to a file system.

Flowchart 500 is an exemplary flow diagram of intelligent heuristics applied to a plurality of aggregated requests for access to a file system. It is to be understood that not all steps of FIG. 5 are required, that additional steps may be incorporated or interspersed with the illustrated steps, and that particular steps as illustrated may be rearranged or omitted as necessary without departing from the scope of the invention. At step 510, a method for applying intelligent heuristics to a request for access to a file system begins. The method proceeds to step 512.

At step 512, a heuristic for detecting a bulk data copy operation is selected. A heuristic may be chosen from a repository of available predefined heuristics in a manner similarly to that chosen at step 412, discussed above. The heuristic may be based on characteristics indicative of a particular bulk data copy operation, and may be defined in terms of or more of a plurality of "fingerprints" describing behaviors of known bulk data copy operations through a file system. The "fingerprint" may understand an order in which this or other operations may index and traverse the data set requested for a bulk data copy. A repository of "fingerprints" may be maintained and extended to describe known bulk data copy operations across an arbitrary number of possible file systems and implementations of bulk data copy operations, and new fingerprints may be added by executing the operation and monitoring the manner in which the copy operation accesses individual files and directories during completion of the request, as discussed above. The "fingerprints" themselves may be stored in any data structure or combination of data structures that may facilitate their use. The method then proceeds to step 514.

At step 514, a plurality of requests by a user for access to a file system are received. The user request may be formatted arbitrarily according to the user interface, network interface, file system used, or any other parameter of the client device from which the user makes the request or the server device at which the user request is received and processed, as discussed above with respect to step 414. Similarly to step 414, the user request may here also be made via a graphical user interface ("GUI") or a command line interface. The requests may be received in a relatively short amount of time for processing according to e.g., a batch, or may be received over a longer time period, where each request may be handled independently from the others. The method then proceeds to step 516.

At step 516, the requests are aggregated. A history of recent requests may be generated to determine, in later steps, whether the aggregated requests fit a pattern indicating various characteristics of permitted or unauthorized bulk data copy operations. In some embodiments, the current request is permitted or halted based on an aggregation of the current request with one or more previous requests. In some embodiments, aggregated requests are stored as a cache, where selected prior requests up to a predefined point in time or over a predetermined time period are stored. In some embodiments, only prior requests identified as bulk data copy operations are stored. The aggregated requests themselves may be stored in any data structure or combination of data structures that may facilitate their use. The method then proceeds to step 520.

Similar to method 400, once the user request is received at the file system, one or more steps may be executed to determine whether a permitted bulk data copy operation has occurred. While a plurality of steps are discussed below determining various aspects of the received user request, it is understood that the below-noted determinations are exemplary in nature, and that determinations may be omitted, rearranged, or substituted for other operations without departing from the scope of the invention. In some embodiments, the bulk data copy operation is allowed to begin, in order to preserve responsiveness of the file system and overall productivity of users making requests of the system.

At step 520, it is determined whether the aggregated requests correspond to a pattern of bulk data copy operations. Some or all of the aggregated requests may individually be matched against one, some or all of the "fingerprints" to determine whether the operations, as a whole, exhibit characteristics of a pattern or sequence of bulk data copy operations. In some embodiments, if a bulk data copy operation among the aggregated requests exhibits characteristics of one or more types of bulk data copy operation, it can be determined whether the operation is sufficiently similar to the "fingerprint" to classify the operation as a bulk data copy operation; e.g., it is determined whether the operation is similar according to a predetermined percentage of characteristics of the "fingerprint" matching characteristics of the executing copy operation. In some embodiments, the bulk data copy operation matches all characteristics of the "fingerprint" before being determined to be a bulk data copy operation.

In some embodiments, a pattern of bulk data copy operations exists if a predetermined threshold number or percentage of the aggregated requests are determined to be bulk data copy operations. If the operation, together with the aggregated requests, is not determined to correspond to a pattern of bulk data copy operations, then the operation is permitted and the method proceeds to step 540, where the request is permitted to continue to completion. If the operation is determined to be a bulk data copy operation, the method proceeds to step 522.

At step 522, it is determined whether the pattern of bulk data copy operations exceed a threshold for permitted data copy operations. As with step 422, in some instances a pattern of bulk data copy operations of a certain scale are both permitted and promote user productivity. In these instances, bulk data copy operations are permitted, for example, where the number of files and directories requested to be copied is below a predetermined permitted copy threshold. The permitted copy threshold may be defined similarly to the permitted copy threshold with respect to step 422, and may thus be tailored to the specific requirements of the file system. In some embodiments, step 522 is omitted and no operations identified as bulk data copy operations are permitted. If the operation is not determined exceed the permitted copy threshold, then the operation is permitted and the method proceeds to step 540, where the request is permitted to continue to completion. If the operation is determined to exceed the permitted copy threshold, the method proceeds to step 524.

At step 524, it is determined whether the user is authorized to execute a pattern of bulk data copy operations exceeding the permitted copy threshold. The user's identity may be compared to a repository of users permitted to execute a pattern of bulk data copy operations of any size. As with step 424, the user's permissions may, for example, be authorized against a repository storing permissions specific to bulk data copy operations, or may be authorized against an external repository, such as file system permissions information maintained by a UNIX or UNIX-like system. In some embodiments, step 524 is omitted and no pattern of bulk data copy operations is permitted. If the user is authorized to exceed the permitted copy threshold, then the operation is permitted and the method proceeds to step 540, where the request is permitted to continue to completion. In some embodiments, step 524 occurs before step 522, and if it is determined that the user is authorized to execute bulk data copy operations of any size, then the method proceeds immediately to step 540. If user is not authorized to execute the bulk data copy operation exceeding the permitted copy threshold, the method proceeds to step 530.

At step 530, the bulk data copy operation is halted. In some embodiments, a bulk data copy operation that has already begun is halted. Once the request is halted, additional restrictions may be placed on the user making the unauthorized request. Similarly to restrictions discussed with respect to step 430, the user's subsequent file access requests may be prevented from commencing, resulting in a 'lock-out' of the user from the file system. Restrictions may be limited to subsequent data copy operations, and may be limited to preventing data copy operations for a predetermined time period. In some embodiments, restrictions on the user may be more severe. Additional or substitute restrictions may be placed on the user as are known, and may be combined with, replace, or supplement the above-noted restrictions as appropriate to meet particular and varying security requirements.

At step 532, a notification of halting is sent to a system administrator or other security system for further resolution. The notification and subsequent optional security countermeasures vary depending on the type of enterprise and the sensitivity of the information being protected on the file system. Examples of notifications and countermeasures are similar to those discussed above with respect to step 432. In some embodiments, the user is not notified of the restrictions enacted after the unauthorized bulk data copy operation, and is not notified that the requested operation is not authorized. In some embodiments, denials of further access to copy operations or the file system appear to the user as failures of the file system in handling user requests. In some embodiments, no notification of halting is sent once a bulk data copy operation is halted. The method then proceeds to step 550.

At step 540, a bulk data copy operation is permitted to continue to completion. The method then proceeds to step 550.

At step 550, the method ends. In some embodiments, the method is be implemented to continuously poll a file system, or may be invoked as requests are made by users, or may be implemented in any other manner or combination of manners.

Storage media and computer readable media for containing code, or portions of code, can include any appropriate media known or used in the art, including storage media and communication media, such as but not limited to volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

What is claimed is:

1. A method for halting an unauthorized bulk data copy operation, comprising:
    maintaining a repository of fingerprints, each fingerprint in the repository of fingerprints corresponding to a specific bulk data copy operation and indicative of one or more characteristics of the specific bulk copy operation corresponding to that fingerprint, wherein, for at least one fingerprint in the repository of fingerprints, the at least one fingerprint indicates a characteristic related to a file system traversal performed by the bulk data copy operation corresponding to the at least one fingerprint or the at least one fingerprint indicates a characteristic related to a number of files copied by the bulk data copy operation corresponding to the at least one fingerprint;
    receiving, from a user, a request, the request specifying a particular operation that, when executed, accesses a file system;
    determining whether the particular operation is a bulk data copy operation by matching a characteristic of the particular operation against one or more of the fingerprints in the repository;
    upon determining, based on the matching, that particular operation is a bulk data copy operation, detecting whether the particular operation exceeds a threshold associated with a permitted data copy operation; and
    halting the particular operation by the user in response to determining that the request is determined to be a bulk data copy operation and that the threshold is exceeded.

2. The method according to claim 1, further comprising:
    verifying if the user is authorized to execute the bulk data copy operation,
    wherein the halting includes halting the request if the verifying indicates the user is not authorized to execute the bulk data copy operation, the request is determined to be the bulk data copy operation, and the threshold is exceeded.

3. The method according to claim 1, wherein determining whether the request is a bulk data copy operation comprises:
    determining a percentage of total files of the file system that are to be accessed by the request; and
    determining, based on the percentage, whether the request is a bulk data copy operation.

4. The method according to claim 1, further comprising:
    storing a plurality of requests received from the user indicating access to the file system;
    aggregating the plurality of requests; and
    determining a percentage of the plurality of requests that are bulk data copy operation requests; and,
    wherein the determining includes determining according to a heuristic, and based on the percentage of the plurality of requests that are bulk data copy operation requests, whether the aggregated requests correspond to a pattern of bulk data copy operations; and
    wherein the detecting includes detecting whether the aggregated requests exceed a predetermined threshold of permitted data copy operations.

5. The method according to claim 1, wherein:
determining whether the request is a bulk data copy operation comprises determining whether the request is a bulk data copy operation based on a heuristic that corresponds to a pattern of traversal by the particular operation through the file system.

6. The method according to claim 1, wherein:
determining whether the request is a bulk data copy operation comprises determining whether the request is a bulk data copy operation based on a heuristic that comprises a pattern indicating a depth-first traversal of a hierarchy of the file system.

7. The method according to claim 1, wherein:
determining whether the request is a bulk data copy operation comprises determining whether the request is a bulk data copy operation based on a heuristic that comprises a pattern indicating a breadth-first traversal of the file system.

8. The method according to claim 7, wherein the breadth-first traversal comprises an alphabetical traversal of a hierarchy of the file system.

9. The method according to claim 1, wherein the threshold comprises a percentage of the file system traversed in response to the request.

10. The method according to claim 1, wherein the threshold comprises a number of files of the file system traversed in response to the request.

11. The method according to claim 1, wherein the halting includes halting all subsequent requests from the user indicating access to the file system.

12. The method according to claim 1, wherein the halting includes halting all subsequent requests from the user indicating access to the file system for a predetermined time period.

13. The method according to claim 1, further comprising:
sending a notification of the halting as a security exception, the notification being restricted from the user.

14. An apparatus for halting an unauthorized bulk data copy operation, the apparatus comprising:
a repository of fingerprints, each fingerprint in the repository of fingerprints corresponding to a specific bulk data copy operation and indicative of one or more characteristics of the specific bulk copy operation corresponding to that fingerprint, wherein, for at least one fingerprint in the repository of fingerprints, the at least one fingerprint indicates a characteristic related to a file system traversal performed by the bulk data copy operation corresponding to the at least one fingerprint or the at least one fingerprint indicates a characteristic related to a number of files copied by the bulk data copy operation corresponding to the at least one fingerprint;
a file system storage unit configured to receive a request from a user, the request specifying a particular operation that, when executed, accesses the file system; and
a file system authorization unit configured to:
determine whether the particular operation is a bulk data copy operation by matching a characteristic of the particular operation against one or more of the fingerprints in the repository;
upon determining, based on the matching, that the particular operation is a bulk data copy operation, detect whether the particular operation exceeds a predetermined threshold of a permitted data copy operation; and
halt access to the file system storage unit by the user if the particular operation is determined to be a bulk data copy operation and if the threshold is exceeded.

15. The apparatus according to claim 14, further comprising:
a user authentication unit configured to verify if the user is authorized to execute the bulk data copy operation,
wherein the file system authorization unit is further configured to halt access to the file system storage unit if the user authentication unit indicates the user is not authorized to execute the bulk data copy operation, and the threshold is exceeded.

16. The apparatus according to claim 15, further comprising:
a request cache unit configured to store a plurality of requests received from the user indicating access to the file system unit,
wherein the user authentication unit is further configured to aggregate the plurality of requests, and
the file system authorization unit is further configured to determine according to a heuristic whether the aggregated requests are bulk data copy operations, and detect whether the aggregated requests exceed a predetermined threshold of permitted data copy operations.

17. The apparatus according to claim 14, wherein the threshold comprises a percentage of the file system traversed in response to the request.

18. The apparatus according to claim 14, wherein the threshold comprises a number of files of the file system traversed in response to the request.

19. A computer program product for halting an unauthorized bulk data copy operation, the product being embodied on a non-transitory computer-readable storage medium and executable by a processor to:
maintain a repository of fingerprints, each fingerprint in the repository of fingerprints corresponding to a specific bulk data copy operation and indicative of one or more characteristics of the specific bulk copy operation corresponding to that fingerprint, wherein, for at least one fingerprint in the repository of fingerprints, the at least one fingerprint indicates a characteristic related to a file system traversal performed by the bulk data copy operation corresponding to the at least one fingerprint or the at least one fingerprint indicates a characteristic related to a number of files copied by the bulk data copy operation corresponding to the at least one fingerprint;
receive a request from a user, the request specifying a particular operation that, when executed, accesses a file system;
determine whether the particular operation is a bulk data copy operation by matching a characteristic of the particular operation against one or more of the fingerprints in the repository;
upon determining, based on the matching, that the particular operation is a bulk data copy operation, detect whether the particular operation exceeds a threshold associated with a permitted data copy operation; and
halt access to the file system if the particular operation is determined to be a bulk data copy operation and if the threshold is exceeded.

20. The computer program product of claim 19, the product being embodied on the non-transitory computer-readable storage medium and executable by the processor to:
execute the particular operation;
monitor a manner in which the particular operation accesses files and directories during execution of the particular operation;
generate a new fingerprint based on the manner monitored; and
add the new fingerprint to the repository of fingerprints.

21. The method of claim 1, wherein the fingerprint corresponding to the specific bulk data copy operation relates to an order in which the corresponding bulk copy data operation indexes and/or traverses a data set requested by the corresponding bulk data copy operation, relates to a manner in which the corresponding bulk data copy operation accesses individual files or directories, or relates to a pattern or sequence of the corresponding bulk data copy operation.

\* \* \* \* \*